United States Patent
Gilberton et al.

(10) Patent No.: US 9,544,733 B2
(45) Date of Patent: Jan. 10, 2017

(54) DETECTION OF A MOBILE DEVICE LOCATION

(71) Applicant: THOMSON LICENSING, Issy de Moulineaux (FR)

(72) Inventors: Philippe Gilberton, Geveze (FR); Anthony Laurent, Vignoc (FR); Patrick Fontaine, Rennes (FR)

(73) Assignee: Thomson Licensing (FR)

( * ) Notice: Subject to any disclaimer, the term of this patent is extended or adjusted under 35 U.S.C. 154(b) by 152 days.

(21) Appl. No.: 14/255,266

(22) Filed: Apr. 17, 2014

(65) Prior Publication Data

US 2014/0323156 A1 Oct. 30, 2014

(30) Foreign Application Priority Data

Apr. 30, 2013 (EP) .................................... 13305575

(51) Int. Cl.
*H04W 24/00* (2009.01)
*H04W 4/02* (2009.01)
(Continued)

(52) U.S. Cl.
CPC ............... *H04W 4/025* (2013.01); *G01S 5/18* (2013.01); *G01S 19/45* (2013.01); *G01S 5/0252* (2013.01)

(58) Field of Classification Search
CPC ........... H04W 4/025; G01S 5/18; G01S 19/45; G01S 5/0252
(Continued)

(56) References Cited

U.S. PATENT DOCUMENTS

2011/0039522 A1* 2/2011 Partridge ............... G06Q 30/02
455/414.1
2012/0083285 A1* 4/2012 Shatsky ................. G01S 19/48
455/456.1
(Continued)

FOREIGN PATENT DOCUMENTS

EP 2284574 A2 2/2011
EP 2284574 A3 2/2011
WO WO2010/015854 2/2010

OTHER PUBLICATIONS

Pauline M. Berry et al., "PTIME: Personalized Assistance for CalendAring", pp. 40:1-40:22, ACM 2157-6904/2011/07-ART40, DOI 10.1145/1989734.1989744, ACM Transactions on Intelligent Systems and Technology, vol. 2 No. 4, Article 40, Jul. 2011.
(Continued)

*Primary Examiner* — Marcus Hammonds
(74) *Attorney, Agent, or Firm* — Jack Schwartz & Associates, PLLC

(57) ABSTRACT

This method of detection of a mobile device location, comprises the steps of:
building sound datasets associated with respective candidate locations, each dataset storing a plurality of sounds already captured in the associated candidate location;
capturing at least one surrounding sound;
comparing the captured surrounding sound with the stored sounds within the sound datasets;
identifying the mobile device location on the basis of the comparison result; and
sharing at least one built dataset with at least another user.

10 Claims, 3 Drawing Sheets

(51) Int. Cl.
    *G01S 19/45* (2010.01)
    *G01S 5/18* (2006.01)
    *G01S 5/02* (2010.01)

(58) Field of Classification Search
    USPC .............................................. 455/456.1–457
    See application file for complete search history.

(56) References Cited

U.S. PATENT DOCUMENTS

| | | | |
|---|---|---|---|
| 2012/0083286 A1 | 4/2012 | Kim et al. | |
| 2012/0142378 A1* | 6/2012 | Kim | H04N 21/4394 |
| | | | 455/456.6 |
| 2013/0065611 A1* | 3/2013 | Park | G01S 5/18 |
| | | | 455/456.2 |

OTHER PUBLICATIONS

Woo-Hyun Choi et al., "Acoustic and Visual Signal Based Context Awareness System for Mobile Application", pp. 738-746, IEEE Transactions on Consumer Electronics, vol. 57, No. 2. May 2011, 0098.3063/11, 2011 IEEE.
Robert I. Damper et al. "A Multifunction Domestic Alert System for the Deaf-Blind" pp. 354-359, IEEE Transactions on Rehablitation Engineering, vol. 3. No. 4, Dec. 1995, 1063-652R/95, 1995 IEEE. http://engineeringblog.yelp.com/2012/08/gps-vs-wifi-the-battle-for-location-accuracy-using-yelp-check-ins.html.
Manhyung Han et al. "Comprehinsive Context Recognizer Based on Multimodal Sensors in a Smartphone", pp. 12588-12605, Sensors 2012, 12, 12588-12605, DOI:10.3390/s120912588, Open Acess Sensors, Issn 1424-8220.
Kyuwoong Hwang et al. " Enviornmental Audio Scene and Activity Recognition through Mobile-based Crowdsourcing", pp. 700-705, IEEE Transactions on Consumer Electronics, vol. 58, No. 2, May 2012, 0098-3063/12, 2012 IEEE.
Ling Ma et al. "Enviromental Noise Classification for Context-Aware Applications", 14th International Conference, DEXA 2003, Prague, Czech Republic, Sep. 1-5, 2003.
Yuya Negishi et al., "Instant Learning Sound Sensor: Flexible Real-World Event Recognition System for Ubiquitous Computing" pp. 72-85, Ubiquitous Computing Systems, 4th Annual Symposium, UCS 2007, Tokyo, Japan, Nov. 25-28, 2007 Proceedings, ISBN: 10 3-540-76771-1, Springer-Verlag, Berlin Heidelberg 2007.
Kalyan Subbu et al., "iKnow Where You Are" pp. 469,474, 2009 International Conference on Computational Science and Engineering 978-0-7695-3823-5/09 2009 IEEE, DOI: 10.1109/CSE.2009.55.
S. Verstockt et al. "Assistive Smartphone for People with Special Needs: the Personal Social Assistant", pp. 331-337, 978-1-4244-3960-7/09, 2009, IEEE, HSI 2009, Catania, Italy, May 21-23, 2009.
Neil Yorke-Smith, et al., "Like an Intuitive and Courteous Butler: A Proactive Personal Agent for Task Management" pp. 337-344, 6th International Conference on Autonomous Agents and Multiagent Systems (AAMAS 2009) May 10-15, 2009, Budapest Hungary.
M. Azizyan etal: SurroundSense: Mobile Phone Localization Using Ambient Sound and Light, Sep. 22, 2008, the whole document.
A. Offstad etal:AMPL: Accelerometer Augmented Mobile Phone Localization, MELT '08, Sep. 2008, San Francisco, USA Sep. 21, 2008,the whole document.
"Google Now" From Wikipedia, the free encyclopedia, http://en.wikipedia.org/wiki/Google_Now, pp. 1-4.
"Siri" From Wikipedia, the free encyclopedia, http://en.wikipedia.org/wiki/Siri.
Search Report dated Aug. 12, 2013.

* cited by examiner

DETECTION OF A MOBILE DEVICE LOCATION

This application claims the benefit, under 35 U.S.C. §119 of European Patent Application No. 13305575.6, filed Apr. 30, 2013.

FIELD OF THE INVENTION

The present invention generally relates to the field of localization of devices and/or users.

More particularly, the invention deals with the identification of a particular environment in which a mobile device is located.

Thus, the invention concerns a method of detection of a mobile device location. It also concerns a corresponding detection apparatus and a computer program implementing the detection method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Nowadays, a lot of available services are offered to users on different mobile terminals such as tablets and smartphones. This proliferation of services resulted in the apparition of assistance tools that help the users for organizing their digital things, e.g. media content, documents, Internet of Things (IoT), TV programs, etc. These tools are known as Personal Assistants or Personal Agents. Their purpose is to propose to end users helpful and personalized activities to do at the right time and the right location.

Commercial examples of these personalized assistants are Google Now (http://en.wikipedia.org/wiki/Google_Now) or Siri (http://en.wikipedia.org/wiki/Siri_(software)). They are based on context awareness and more particularly on the geolocalization of the end user, generally using GPS (Global Positioning System) and Wifi services which are the most popular features available on a smartphone.

However, although the location results obtained by GPS are better than those obtained by Wifi, GPS localization accuracy does not exceed 10 to 20 meters. Besides, it necessitates a prohibitive acquisition time of the location coordinates that can reach several seconds, thus increasing the response time of the Personal Assistant service and degrading the end user Quality of Experience (QoE). Moreover, GPS localization is generally not operational in an indoor environment, as it requires satellite signals reception. As a consequence, GPS is not able to distinguish between rooms or floors, for instance.

Existing alternative methods to detect a user presence use human face or voice recognition. However, the involved digital processing is too complex to be performed in a smartphone. Besides, the localization results are subject to errors due, for example, to ambient noise, low light intensity, different voice tone, etc.

The document US2012/0083285 describes a method for obtaining enhanced location information for a mobile device combining the use of a GPS receiver and of additional data providing context information for the mobile device.

However, the method disclosed in this document does not permit accurate identification of the environment in which the mobile device is located. For instance, this method is not able to detect if the mobile device is in the user's home or in a friend's home.

SUMMARY OF THE INVENTION

The present invention proposes a solution for improving the situation.

Accordingly, the present invention provides a method of detection of a mobile device location, comprising:
- building sound datasets associated with respective candidate locations, each dataset storing a plurality of sounds already captured in the associated candidate location;
- capturing at least one surrounding sound;
- comparing the captured surrounding sound with the stored sounds within the sound datasets;
- identifying the mobile device location on the basis of the comparison result; and
- sharing at least one built dataset with at least another user.

The candidate locations are locations in which the mobile device is likely to be, as for instance the home or the office of the user of said mobile device.

By building sound datasets associated with the locations in which the mobile device is likely to be, the present invention provides a unique characterization of each location on the basis of already captured sounds within said location.

Furthermore, the user may share the built dataset with linked users, for instance a community of friends. The datasets associated with the community members homes are shared between said members, so that a personal assistant system can propose services to community members separately or together when they are in a same location.

This sharing thus enables a location to be automatically identified for other linked users and also enables the detection of more than one linked users in one shared location.

The present invention's solution is simple to implement and non costly.

Preferably, the mobile device comprises a microphone.

Advantageously, the mobile device is a user terminal, particularly a smartphone or a tablet.

The mobile device can also be a connected watch.

Thus, the detection of the mobile device location may be used as a means to detect the user's location.

Advantageously, the mobile device location is a fixed location or a moving location.

Examples of fixed locations comprise a user's home, a friend's home or a particular room in a given home, such as the kitchen. Examples of moving locations comprise a car, a subway, a bus, etc.

Advantageously, the number of stored sounds in each dataset is at least equal to six, and preferably equal to ten.

This redundancy renders the location detection more reliable.

Preferably, the identified mobile device location is the location whose associated dataset stores the highest number of captured surrounding sounds, said number being at least equal to a threshold.

The value of the threshold is set in such a way to ensure that the detected location is the real one, i.e. to reduce the occurrence of false positives.

Advantageously, the candidate locations are determined after a step of preliminary localization.

Advantageously, the step of preliminary localization uses a satellite positioning system.

For instance, by virtue of GPS (Global Positioning System), a first selection of the mobile device candidate locations is made. For example, the GPS may provide the address in which the mobile device is located. A plurality of candidate locations may correspond to this address, such as the user's home or his neighbour's home, different rooms or floors of the user's home, etc.

Alternatively, the step of preliminary localization uses a WiFi positioning system.

Advantageously, the method comprises uploading at least one built sound dataset on a remote server.

According to an embodiment, the remote server is a cloud storage server.

The invention also provides an apparatus of detection of a mobile device location, comprising:
 a) a storage module for storing sound datasets associated with respective candidate locations, each dataset storing a plurality of sounds already captured in the associated candidate location;
 b) a sensor module for capturing at least one surrounding sound; and
 a) a processing module for comparing the captured surrounding sound with the stored sounds within the sound datasets and identifying the mobile device location on the basis of the comparison result; and
 b) a connection module to a network, for instance to the Internet network, said connection module enabling sharing at least one stored dataset with at least another user.

Advantageously, the apparatus comprises a microphone.

According to a particular embodiment, the apparatus is the mobile device.

Advantageously, the apparatus is a smartphone or a tablet or a gateway or a connected TV.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the detection method of the invention. The diagrams of FIGS. 3 and 4 illustrate examples of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
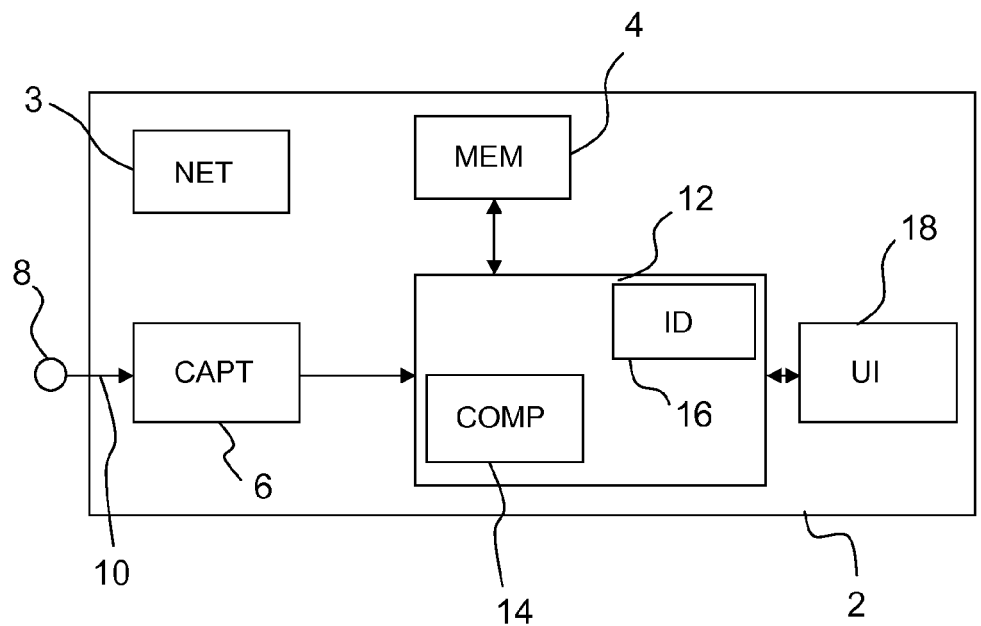
FIG. 1 is a schematic view of a detection apparatus according to an embodiment of the invention.

Referring to FIG. 1, there is shown therein a schematic view of an apparatus 2 of detection of a mobile device location according to an embodiment of the invention.

The mobile device is for instance a user terminal, particularly a smartphone, tablet or any device equipped with a microphone. In this case, the detection of the mobile device location is used as a means to detect the user's location.

The detection apparatus 2 comprises a connection module 3 for connecting to the Internet network.

The detection apparatus 2 can be the mobile device itself. It may also be a fixed connected device of the user's home, such as a gateway or a set-top box or a connected TV.

The detection apparatus 2 further comprises a storage module 4 for storing sound datasets associated with different locations in which the mobile device is likely to be, for example different rooms of the user's home.

Each dataset stores a plurality of sounds already captured in its associated location. The stored sounds may be audio files or audio data files containing information characterizing uniquely the sounds, such as sound signatures obtained by audio fingerprinting for example.

Preferably, each dataset associated with a given location has an identifier characterizing uniquely said dataset.

The detection apparatus 2 further comprises a sensor module 6 for capturing a plurality of surrounding sounds recorded by a microphone 8 linked to the sensor module 6 through a transmission link 10.

For instance, the microphone 8 is a microphone attached to the mobile device, for example the smartphone's or the tablet's microphone. The transmission link 10 is preferably a wireless radio link, such as a WiFi or a 3G link, between the mobile device and the apparatus 2.

When the detection apparatus 2 comprises a microphone, the microphone 8 is its own microphone.

The sensor module 6 is able to capture the recorded sounds in the form of audio files or of signatures generated from the recorded sounds, for example using an audio fingerprinting technique.

The stored sounds within the storage module 4 are preferably captured by the sensor module 6. In this case, the detection apparatus 2 is used to build the sound datasets.

According to another embodiment, some or all the sounds within the storage module 4 are captured remotely and received, in the form of audio files or signatures, by the detection apparatus 2 in order to be stored and used for the detection.

Moreover, the detection apparatus 2 comprises a processing module 12.

The processing module 12 comprises a comparison sub-module 14 for comparing sounds captured near the mobile device by the sensor module 6 with the stored sounds within the sound datasets in the storage module 4 in order to identify the mobile device location on the basis of the comparison result.

The processing module 12 further comprises an identifier generation sub-module 16 which is able to generate for each stored dataset in the storage module 4 an identifier characterizing uniquely said dataset.

According to an embodiment, the detection apparatus 2 further comprises a user interface 18. The user interface 18 permits to the detection apparatus 2 to interact with the user, for example to prompt the user to name or ignore a newly captured sound by the sensor module 6, for example in order to build a new dataset associated with a new location. The user interface 18 may also be used to provide to the user the detection result, for example a screen displaying the detected dataset identifier.

According to another embodiment, the user interface 18 is not part of the detection apparatus 2 but is part of a user's device connected to said detection apparatus 2. For instance, the user interface may be on the mobile device whose localisation is being detected.

The location detection result provided by the detection apparatus 2 is advantageously used by a user's Personal Assistant service implemented on the mobile device. For example if the user, i.e. more exactly said mobile device, is at home, the Personal Assistant will recommend to the user to watch on the living room big screen a personalized media content entertainment program. However, if the user is out of home, the personal assistant will limit the entertainment experience according to the user's mobile device capability.

Figure 2:
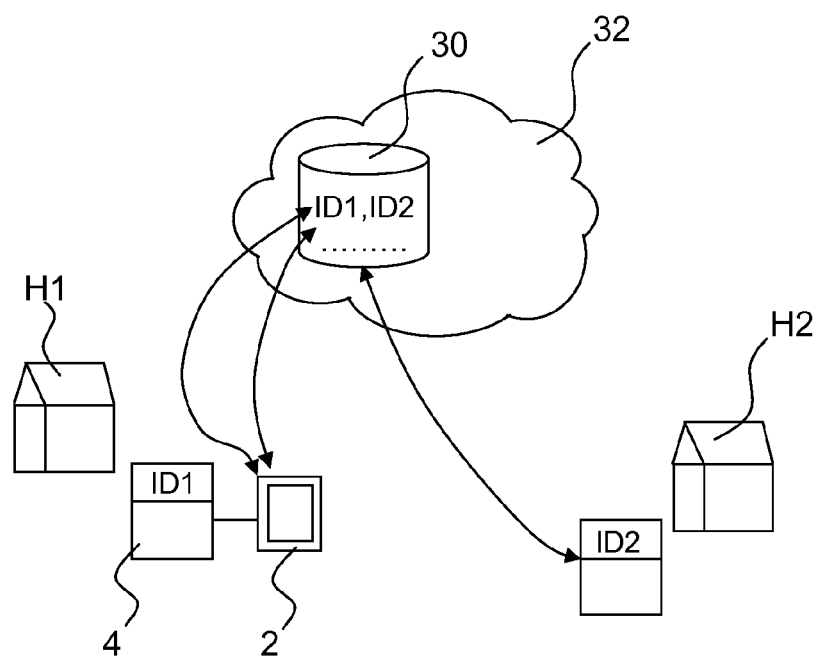
FIG. 2 represents an example of a system implementing the detection method of the present invention.

FIG. 2 shows an example of a service deployment architecture using the detection apparatus of FIG. 1.

In this example, the detection apparatus 2 is the user's mobile device, for instance the user's smartphone. In the storage module 4, a first sound dataset having an identifier ID1 has already been stored. This first sound dataset contains sounds captured from the user's home H1.

Furthermore, a user's friend has also a detection apparatus (not represented) in which a second sound dataset having an identifier ID2 has already been stored. This second sound dataset contains sounds captured from the friend's home H2.

According to the represented embodiment, the datasets corresponding to both homes are uploaded on a remote server 30, for example a cloud storage server shared by both the user and the friend. This remote server 30 constitutes a database storing the datasets associated with different locations.

The remote server 30 and the detection apparatus 2 are connected through the Internet network 32.

After synchronization between the detection apparatus 2 and the remote server 30, the second sound dataset is downloaded by the detection apparatus 2. Thus, when the user is at his friend's home, his position is detected by the detection apparatus 2. In this case, a Personal Assistant service of the user, implemented in the mobile device 2, may suggest suitable services to the user, such as recommending watching media content that would be of interest to both the user and the friend on the friend's big screen.

Figure 3:
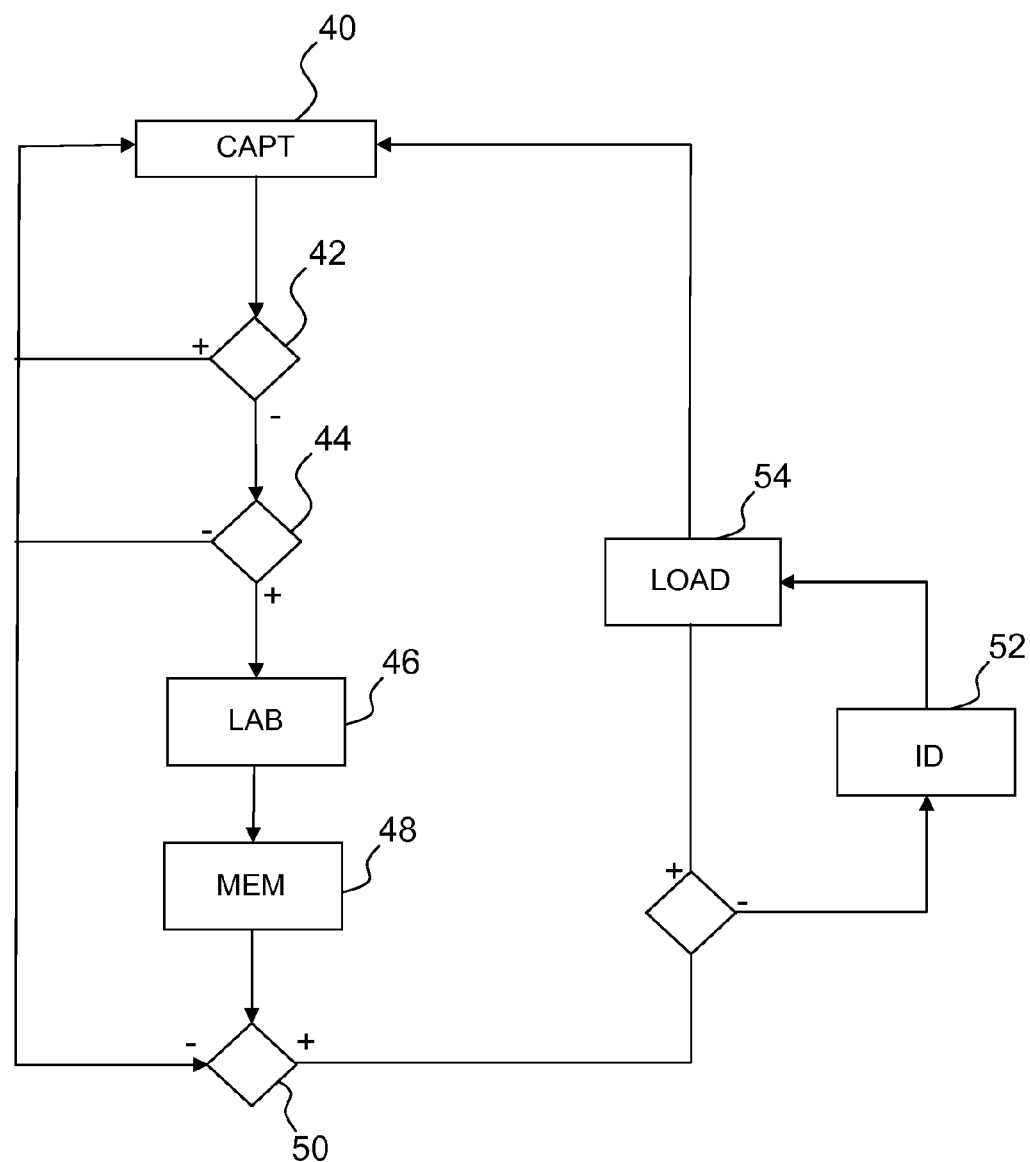
FIG. 3 is a flowchart detailing the steps of building sound datasets according to an embodiment of the present invention.

The flowchart of FIG. 3 details the steps of building a new sound dataset according to an embodiment of the present invention.

For example, the new sound dataset may be associated with a fixed location, such as the user's home or more precisely the bedroom, the living room, the kitchen, . . . , the user's office, the market, the beach, the stadium, etc. The new sound dataset may be also associated with a moving location, such as the user's car, the bus, the subway, etc.

The goal of building a sound dataset is to give a unique characterization of the considered location environment. For example, when the location is the user's home, the sounds may comprise a door bell, mobile/fix phone rings, alarm clock ring, user's baby cry, a pet's sounds (i.e.: barking, mewing, tweeting, etc. . . . ). When the location is the user's personal car, the sounds may comprise the door and the engine sounds. When the location is a particular room of the house such as the kitchen, the sounds may comprise the fridge sound, the oven ring, etc. Voice sounds may be also used in order to detect who is in the location and refine the location detection, for example to distinguish the user's office from a colleague's office.

Advantageously, residential surrounding sounds can be considered to indicate if the location is near a train station, an airport, a noisy area, etc.

At step 40, a sound is captured by the sensor module 6.

At step 42, the processing module 12 checks if the captured sound is already present in the considered dataset. If the captured sound is already present, it is ignored and the process returns to step 40.

If the captured sound is a new sound, the processing module 12 interacts with the user interface 18, at step 44, to ask the user if he wants to keep the sound or to ignore it. If the user chooses to ignore the sound, the process returns to step 40. If the user wants to keep the sound, he is requested, at step 46, to label said new sound. For example, when the dataset is associated with the kitchen, the new sound may correspond to the fridge sound and the user may label this sound "fridge" at step 46.

At step 48, the new sound is stored with its name in the considered dataset in the storage module 4.

At step 50, the number of sounds already stored within the considered dataset is compared to a threshold, for instance comprised between six and fifteen, preferably equal to ten. If the number of stored sounds is at least equal to the threshold, and the considered dataset does not have been allocated an identifier yet, the identifier generation sub-module 16 generates, at step 52, an identifier of said dataset. This identifier is generated, for instance, by using a pseudo-random mechanism or with a fingerprint based on a suitable combination of the sounds within the dataset. The dataset identifier may also be a name chosen by the user, for example "kitchen".

At step 54, the user is invited, through the user interface 18, to upload the newly built dataset to the remote server 30 of the cloud storage service.

When the detection apparatus 2 is different from the mobile device, the user may advantageously be invited to upload the dataset on the mobile device also in order to permit an easy retrieval in case of off-line access.

At step 54, the user may be also invited to share the dataset with his community of friends.

If, at step 50, the number of sounds in the dataset is still less than the threshold, the process returns to step 40.

Figure 4:
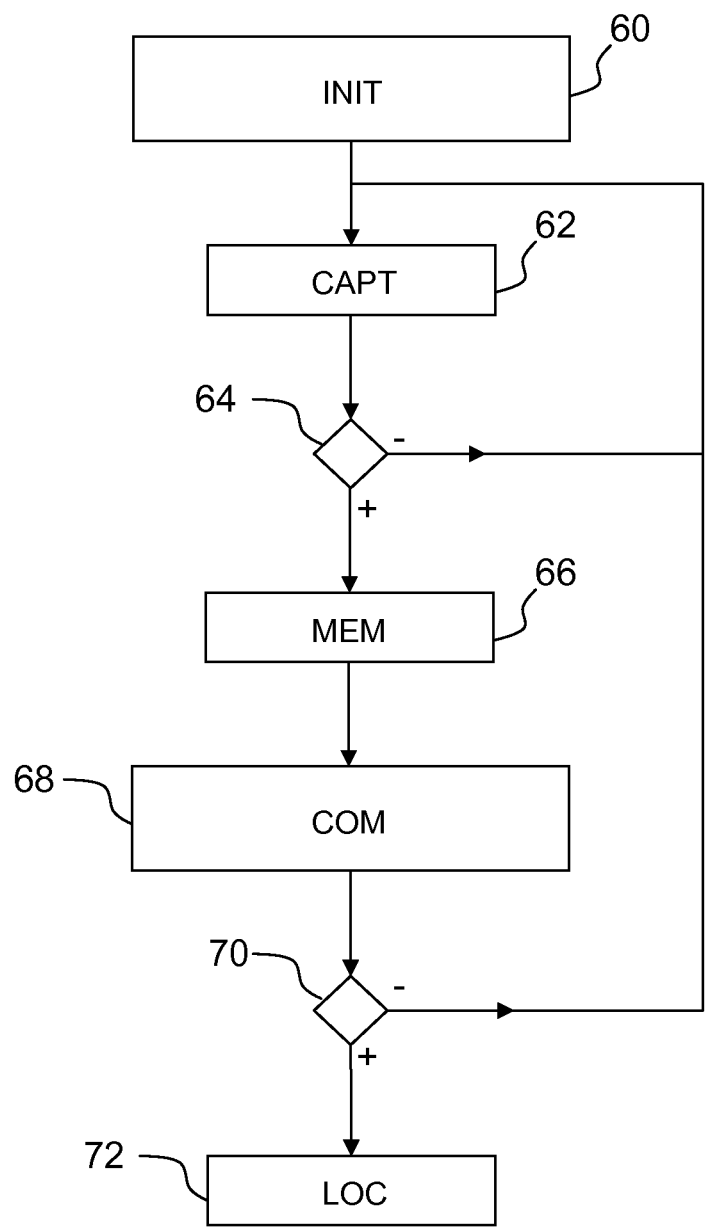
FIG. 4 is a flowchart detailing the steps of the detection method of the invention, according to an embodiment.

The flowchart of FIG. 4 details the steps implemented by the detection apparatus 2 in order to detect a current location of the mobile device.

At step 60, a list of candidate places in which the mobile device is likely to be is initialized.

This list may comprise all the places referenced in the storage module 4 or may comprise only some selected places. For instance, it may be determined, thanks to the GPS for example, that the mobile device is within a given area without being able to determine precisely the place. For instance, the exact location may correspond to one of several homes in a building or to one of adjoining houses or to one of different rooms of a home, etc. Thus, the candidate list will comprise only these first selected places.

At step 62, a sound surrounding the mobile device is captured by the sensor module 6.

At step 64, the comparison sub-module 14 checks if the captured sound is present in at least one dataset of the candidate places.

If the captured sound is not present in any dataset, it is discarded and the process returns to step 62.

If the captured sound is present in at least one dataset, the detection apparatus 2 saves, at step 66, said sound in the storage module 4.

At step 68, the comparison sub-module 14 compares the captured surrounding sounds at step 62 with the stored sounds in the datasets associated with the candidate places. It determines then which candidate place has the more similar sounds stored in its associated dataset.

At step 70, this highest number of common sounds is compared to a threshold. This threshold is set in such a way that it ensures that the found candidate place is indeed the real location of the mobile device. Thus, the number of false positives is reduced. The threshold is for example equal to four.

If said highest number of common sounds is less than the threshold, the process returns to step 62.

If said highest number is at least equal to the threshold, the location of the mobile device is identified, at step 72, as the determined candidate place at step 68.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as a reference to the plural and vice versa.

A person skilled in the art will readily appreciate that various parameters disclosed in the description may be modified and that various embodiments disclosed and/or claimed may be combined without departing from the scope of the invention.

Indeed, although the description above considered the mobile device location detection as a means to detect the location of the user in order to improve the Personal Assistant service, the present invention may be advantageously used in the purpose of detecting the position of the mobile device itself independently of the user, for example to find a lost mobile device.

The invention claimed is:

1. A method of detection of a location of a mobile device belonging to a community of mobile devices, said method comprising:
   building sound datasets, where each sound dataset is stored in a memory according to a respective candidate location and includes at least six captured sounds, wherein before each captured sound is added to the sound datasets:
      determination is made whether the sound is already present in the sound datasets,
      when the sound is not already present, the user of the mobile device is asked whether to keep or ignore the sound, when the user keeps the sound,
      the user provides a label associated with the respective candidate location to be added to the sound, and
      the sound is stored in one of the sound datasets according to the label and the respective candidate location in the memory;
   determining an approximate location of the mobile device using GPS (global positioning system) and populating a list of candidate locations for the mobile device;
   capturing at least one surrounding sound;
   comparing the captured at least one surrounding sound with the sounds within the sound datasets corresponding to the list of candidate locations;
   identifying the mobile device location as a candidate location from the list of candidate locations having a highest number of sounds similar to the at least one captured surrounding sound on the basis of the comparison result, said number being at least equal to a threshold; and
   sharing at least one of the stored sound datasets with at least one other mobile device belonging to the same community.

2. The method of claim 1, wherein the mobile device comprises a microphone for capturing the at least one surrounding sound.

3. The method of claim 1, wherein the mobile device location is one of a fixed location and a moving location.

4. The method of claim 1, wherein the number of stored sounds in each dataset is equal to ten.

5. The method of claim 1, comprising uploading at least one built sound dataset on a remote server for storage.

6. The method of claim 5, wherein the remote server is a cloud storage server.

7. An apparatus for detection of a mobile device location, comprising:
   a memory for storing sound datasets, each sound dataset stored according to a respective candidate location and storing at least six captured sounds, wherein before each captured sound is added to the sound datasets:
      determination is made whether the sound is already present in the sound datasets,
      when the sound is not already present, the user of the mobile device is asked whether to keep or ignore the sound,
      when the user keeps the sound, the user provides a label associated with the respective candidate location to be added to the sound, and
      the sound is stored in one of the sound datasets according to the label and the respective candidate location in the memory;
   a sensor for capturing at least one surrounding sound;
   a processor for determining an approximate location of the mobile device using GPS (global positioning system) and populating a list of candidate locations for the mobile device, comparing the captured surrounding sound with the stored sounds within the sound datasets corresponding to the list of candidate locations, and identifying the mobile device location as a candidate location from the list of candidate locations having a highest number of sounds similar to the at least one captured surrounding sound on the basis of the comparison result, said number being at least equal to a threshold; and
   a connector for connecting to a network, said connector enabling sharing at least one stored dataset with at least another user.

8. The apparatus of claim 7, further comprising a microphone.

9. The apparatus of claim 7, wherein said apparatus is the mobile device.

10. A non-transitory computer-readable program medium comprising computer-executable instructions to enable a computer to perform the method of claim 1.

\* \* \* \* \*